US012650303B2

(12) United States Patent
Ekholm

(10) Patent No.: US 12,650,303 B2
(45) Date of Patent: Jun. 9, 2026

(54) WAVE-FIELD INERTIAL MEASUREMENT SYSTEM

(71) Applicant: Woods Hole Oceanographic Institution, Woods Hole, MA (US)

(72) Inventor: Alexander K Ekholm, Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 306 days.

(21) Appl. No.: 18/600,019

(22) Filed: Mar. 8, 2024

(65) Prior Publication Data

US 2024/0247933 A1     Jul. 25, 2024

Related U.S. Application Data

(63) Continuation-in-part of application No. 18/120,365, filed on Mar. 11, 2023, now abandoned.

(60) Provisional application No. 63/451,556, filed on Mar. 11, 2023, provisional application No. 63/318,878, filed on Mar. 11, 2022.

(51) Int. Cl.
    G01C 13/00          (2006.01)
(52) U.S. Cl.
    CPC .................................. G01C 13/002 (2013.01)
(58) Field of Classification Search
    CPC ...... G01C 13/002; G01C 21/26; G01C 13/00;
        G01C 17/38; G01C 21/1654; G01C
        21/185; G01C 21/188; G01C 9/02; G01C
        13/004; B63B 49/00; B63B 21/00; B63B
        23/28; B63B 23/58; B63B 23/70; B63B
        35/00; B63B 71/20; B63B 2035/009;
        G01P 13/02; G01P 5/00; G01P 21/025;
        G01P 13/002; G01P 13/0033; G01P 5/02;
        G01P 5/06; G01P 5/12; G01P 1/08; G01P
        13/0073; G01P 13/025; G01P 5/04; G01P
        5/165; G01P 5/18; G01P 5/14
    See application file for complete search history.

(56) References Cited

U.S. PATENT DOCUMENTS

| 4,220,044 | A | * | 9/1980 | LeBlanc | ................... | G01P 7/00 |
| | | | | | | 73/170.04 |
| 6,382,022 | B1 | * | 5/2002 | Martinez | .............. | G01C 13/002 |
| | | | | | | 73/178 R |

(Continued)

FOREIGN PATENT DOCUMENTS

| CN | 112629501 A | * | 4/2021 | ........... | G01C 13/002 |
| CN | 114076593 A | * | 2/2022 | ......... | G01C 19/5747 |

(Continued)

*Primary Examiner* — Andre J Allen
(74) *Attorney, Agent, or Firm* — Douglas Denninger

(57)          ABSTRACT

A device and method of using same having an inertial measurement unit (IMU), a controller, an activator, and an absolute position sensor configured to measure fluid-body waves. The controller calculates its orientation in a relative frame using data obtained from the IMU and fixed-point arithmetic. The controller transforms the relative orientation information into absolute units using data obtained from the absolute sensor and fixed-point arithmetic, producing wave measurements. The controller may then select a subset of wave measurements for transmission via an optional communications mechanism to a remote user.

18 Claims, 5 Drawing Sheets

(56)                    References Cited

U.S. PATENT DOCUMENTS

| | | | | |
|---|---|---|---|---|
| 11,897,589 | B1 * | 2/2024 | Schmidt | B63B 39/10 |
| 12,061,083 | B2 * | 8/2024 | Previsic | G06F 30/27 |
| 12,422,259 | B2 * | 9/2025 | Saha | G01C 21/005 |
| 2015/0025804 | A1 * | 1/2015 | Jones | G01C 13/004 |
| | | | | 702/2 |
| 2019/0064364 | A1 * | 2/2019 | Boysel | G01S 13/865 |
| 2024/0247933 | A1 * | 7/2024 | Ekholm | G01C 13/002 |

FOREIGN PATENT DOCUMENTS

| | | | | | |
|---|---|---|---|---|---|
| CN | 117191086 | A | * | 12/2023 | |
| CN | 117968673 | A | * | 5/2024 | G01S 19/52 |

* cited by examiner

<u>100</u>

WAVE-FIELD INERTIAL MEASUREMENT SYSTEM

CROSS-REFERENCE TO RELATED APPLICATION(S)

This application is a Continuation-In-Part of U.S. application Ser. No. 18/120,365 filed on Mar. 11, 2023 and claims priority to U.S. Provisional Application Nos. 63/451,556 filed on Mar. 11, 2023 and 63/318,878 filed on 11 Mar. 2022. The entire contents of each of the above-mentioned applications are incorporated herein by reference as if set forth herein in their entirety.

GOVERNMENT SUPPORT CLAUSE

This invention was made with Government support under N00014-15-1-2293 awarded by the NAVY Office of Naval Research and under NA130AR4830233 awarded by the NOAA. The Government has certain rights in the invention.

FIELD OF THE DISCLOSURE

This application relates to the measurement of waves in a fluid body. More specifically, this application relates to a wave sensor that requires only small amounts of electricity and computational capacity.

BACKGROUND

All bodies of water generate waves. Waves range from small, wind-driven wavelets to large, long waves driven by the tides. Waves have periods, relating to the frequency between the time between wave maximums, and wave periods can range anywhere from 12 hour to half a second. The most common wave periods are within 0.5 to 30 seconds, commonly referred to as wind waves. Wind waves vary greatly and make wave measurement and characterization difficult. Small wind waves are influenced by local wind patterns and grow into larger waves as wind strength, duration and distance increases. Therefore, in a local region wave patterns result from a combination of local wind waves from multiple wind sources, including local sea breezes (generating smaller waves) and distant storm generated long, swell waves.

In order to truly measure and understand the waves in a local area, the amplitude, period and direction of waves must be accurately measured. Accurate measurement results from a measurement of a statistically significant number of waves of a given type (period, size and etc.). A commonly applied measurement number is 100 cycles of the longest expected period-sized wave. For example, if a given body of water is expected to have a wave period of 5 seconds, a measurement time of 500 seconds would be the minimum measurement time, with additional time often being measured to ensure enough data collection.

Furthermore, to accurately capture a time series of wave measurements windows of wave measurements are often collected, for example 500 seconds every 10 minutes, or every hour from a surface sensor. In addition, some sensors profile in the water column, that is, the sensor is attached or built into a float that moves up and down through the water column, often holding a (submerged) depth for a period of time, before ascending to the ocean's surface. The float remains at the surface for some time (minutes to an hour) before profiling again. During this time these floats typically relay positional and other sensor data to overhead satellites.

Such a float is also well adapted to measure surface wave conditions while at the surface.

A wave sensor determines the size (amplitude), shape (slope from minimum to maximum), and speed of waves over time, in what is commonly referred to as a time-series of measurements. One common method of measuring movement is with an inertial measurement unit (IMU). IMUs range from 'inexpensive' cell phone IMUs costing from $10 to research grade IMUs costing thousands of dollars or more. With cost comes precision, accuracy, sensitivity and speed. An IMU measures position and orientation in the relative frame of the attached hardware. A relative frame would need to be converted into coordinate frame with additional information. Furthermore, the IMU's data must be interpreted by a controller for proper wave measurement.

Conventional IMU-based wave measurement devices typically are not small, efficient systems. A controller is required to convert IMU measurements and locational information (e.g., GPS) into an understandable wave time-series measurement, requiring significant computing power. Further computing power is required to convert a time-series into a spectral analysis, which is suitable for remote data transfer. Such systems exist for wave measurement when attached to large research vessels or moored sensors with dedicated power and data connections to land. However, small floating sensors have not be able to perform these computational and power-hungry calculations in a timely manner to date.

Conventional wave measurement systems are described, for example, in U.S. Pat. No. 8,654,607 by Strong and U.S. Pat. No. 10,488,554 by Pierik et al. In unrelated technical fields, power consumption has been minimized by power management systems such as disclosed in U.S. Pat. No. 10,416,035 by Rubinstein et al.

It is therefore desirable to have a wave measurement sensor in a small, low-power configuration that is capable of long-term wave measurement without land or vessel-based computer power or electrical supply.

SUMMARY OF THE INVENTION

An object of the present invention is to provide wave measurement devices that can operate remotely for extended periods of time.

Another object of the present invention is to provide a small, low power and low computational power consuming device for measuring wave motion, including height, period and direction.

Another object of the present invention is to provide such devices which can be incorporated in or on a marine float, and interconnected to the float's power source, positional mechanism (e.g., GPS), and communications system (e.g., a satellite communication mechanism).

This invention features a wave measuring device including a controller, an inertial measurement unit (IMU) connected to the controller configured to send IMU orientation data to the controller, and an absolute sensor connected to the controller and configured to send position data to the controller. The controller determines the orientation of the IMU in a relative reference frame of the IMU using the IMU orientation data and fixed-point arithmetic. The controller is configured to transform the relative reference frame into an absolute reference frame using the position data and fixed-point arithmetic, thereby producing wave data.

In certain embodiments, the device further includes an activator connected to the controller, the activator configured to periodically place the controller in a low-power state.

In some embodiments, the controller is configured to use a gradient descent algorithm to determine the orientation of the IMU in the relative reference frame.

In a number of embodiments, the device further includes a housing configured to surround and protect the controller and the IMU. In some embodiments, the device is an oceangoing float and the housing is watertight. In one embodiment, the device is configured to reversibly float at a depth in the ocean and reversibly float on the ocean surface, the device further includes an activator connected to the controller, and the activator is configured to place the controller in a low-power state when the device is below the ocean's surface.

In certain embodiments, the device further includes a communications mechanism connected to the controller. In some embodiments, the controller is configured to select a subset of the wave data as a data subset and transmit the data subset through the communications mechanism.

This invention also features a method of wave measurement including selecting a device having a controller, an inertial measurement unit (IMU) connected to the controller, and an absolute position sensor connected to the controller. The IMU is configured to produce orientation data and the absolute position sensor is configured to produce position data. The method further includes: (i) sending the orientation data from the IMU to the controller; (ii) sending the position data from the absolute sensor to the controller; (iii) calculating, with the controller, the orientation of the IMU in a relative reference frame using the orientation data and fixed-point arithmetic, producing a relative orientation; and (iv) transforming, with the controller, the relative orientation into an absolute orientation using the positioning data and fixed-pointed arithmetic, producing wave data.

In certain embodiments, the method further includes collecting an orientation time series of orientation data with the IMU over a period of time and, optionally, performing a spectrum analysis with the controller on the orientation time series. In some embodiments, the spectrum analysis uses a Fourier transformation. In one embodiment, the device further comprises a communications mechanism connected to the controller.

In some embodiments, the method further includes: selecting a subset of the wave data to produce a data subset; and wirelessly transmitting, with the communications mechanism, the data subset. In one embodiment, the device is selected to include an activator connected to the controller and configured to place the controller in a low-power state. In another embodiment, the step of calculating the orientation of the IMU utilizes a gradient descent algorithm. The device is selected to be an ocean-going float configured to reversibly float at a depth in the ocean; and the method further includes moving the device below the surface of the ocean; and placing, with the activator, the controller in a low-power state when the device is moved below the surface of the ocean.

BRIEF DESCRIPTION OF THE DRAWINGS

In what follows, preferred embodiments of the disclosure are explained in more detail with reference to the drawings, in which.

DETAILED DESCRIPTION

Overview

Figure 1A:
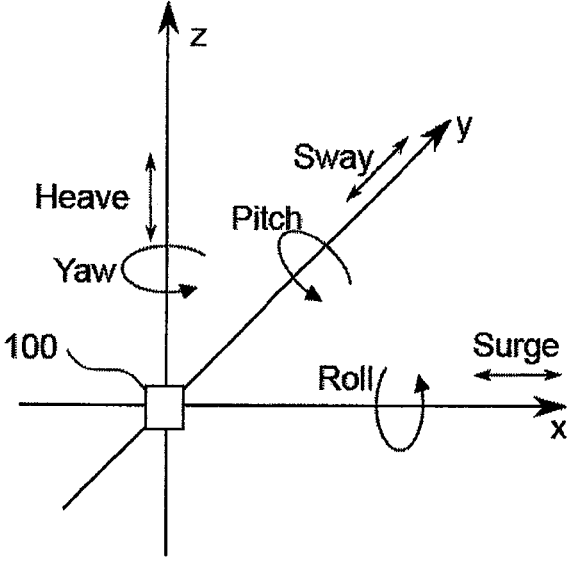
FIG. 1A illustrates forces that a buoy according to the present invention experiences in a fluid body.
Figure 1B:
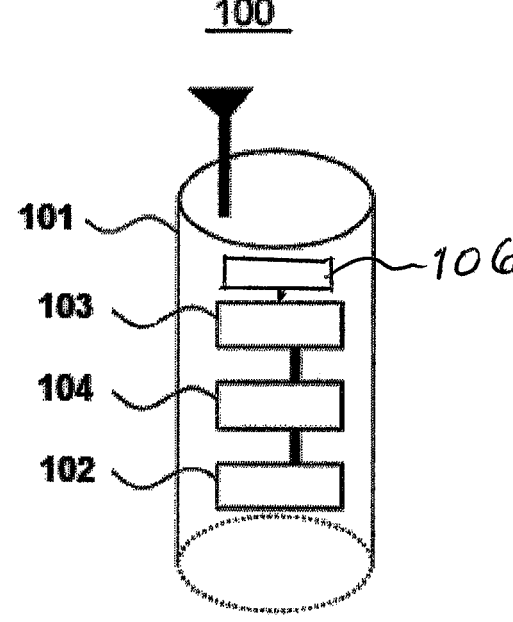
FIG. 1B is a schematic illustration of a buoy according to one embodiment of the present invention.

The present disclosure describes a wave sensor device 100, FIGS. 1A-1B, having at least a housing 101, an inertial measurement unit (IMU) 102, and a controller 103 connected to the IMU. In many embodiments, device 100 also has an activator 104 connected to the controller 103, an Earth-frame sensor (e.g., GPS), referred herein as the absolute sensor 105, FIG. 2, connected to the controller 103, FIGS. 1B-2, a communications mechanism 106, FIGS. 1B-2, and a power source 109 such as V_IN, FIG. 4, and Vin, FIG. 5. Device 100 is also referred to herein as a Wave-field Inertial Measurement System (WIMS). The IMU preferably has a gyroscope, an accelerometer, and a magnetometer and provides measurements from these three subcomponents to the informationally interconnected controller. The controller 103 calculates the float's roll, pitch, and yaw in the float's relative reference frame to calculate wave measurements.

In many embodiments of the present disclosure, the controller 103 determines the orientation of the IMU and therefore overall device 100 in a relative reference frame, and converts this orientation into an absolute reference frame with information provided by the absolute sensor 105. Preferably, the controller 103 uses a gradient descent algorithm to convert from relative to absolute reference frame. In some embodiments, the controller uses fixed-point integer arithmetic during conversion.

Definitions

The term "wave measurements" includes data generated to determine physical parameters such as wave height, wave length (i.e., wave periodicity) and wave direction.

The term "absolute sensor" is used herein includes any sensor or method to determine position in an absolute or planet-centered coordinate frame, including GPS (Global Positioning System) and other GNSS (Global Navigation Satellite System) units for Earth-based systems.

The term "absolute reference frame" as utilized herein includes a planet-centered coordinate frame, such as one provided for Earth by a GPS network. It is also referred to as an "absolute coordinate frame", "absolute orientation", "Earth-fixed coordinates", "Earth-frame" or "Earth reference frame".

IMU 102

The present disclosure provides for an inertia measurement unit (IMU) 102. The IMU 102 may be any suitable solution as known in the art. Preferably, the IMU has an accelerometer, a gyroscope, and a magnetometer. In the currently preferred embodiment, the IMU is a 3-axis gyroscope, 3-axis accelerometer IMU commercially available from InvenSense. The IMU allows for tracking the position and orientation of a moving body object in a relative reference frame. Often the relative reference frame is compared to a known starting point or to measurements in an absolute reference frame from the absolute sensor 105, FIG. 2. IMU allows for relative measurements of pitch, roll, and yaw such as depicted in FIG. 1A. Pitch is the rotation of an object about its transverse (side to side) axis. Roll is the rotation of an object about its longitudinal (front to back) axis and roll is related to transverse stability. Yaw is the rotation of an object about its vertical axis (top to bottom). The IMU's 3-axis gyroscope provides angular velocity of the object. The IMU's 3-axis accelerometer provide acceleration of the object when moving relative to itself. The IMU's magnetometer, when present, provides strength and direction of local magnetic fields, enabling the north direction to be determined.

IMU 102 provides orientation data over a period of time, often referred to as a spectrum, each sub-component of IMU providing one or more spectrum that together makes up the orientation data. The orientation data collected over a preselected period of time is referred to herein as an "orientation time series of orientation data" such as the "repeat in time series" process illustrated in FIG. 2. In one construction, an orientation filter such as filter 308, FIG. 3, includes a sensor-fusion algorithm that is based on the work done by Madgwick et al. (S. O. H. Madgwick, A. J. L. Harrison and R. Vaidyanathan, "Estimation of IMU and MARG orientation using a," in *IEEE International Conference on Rehabilitation Robotics, Rehab Week Zurich, ETH Zurich Science City*, Zurich, Switzerland, 2011) and later improved by Wilson et al. (S. Wilson, H. Eberle, Y. Hayashi, S. O. H. Madgwick, A. McGregor, X. Jing and R. Vaidyanathan, "Formulation of a new gradient descent MARG orientation," *Mechanical Systems and Signal Processing*, vol. 130, pp. 183-200, 2019). The orientation filter determines the instrument's orientation using the low-frequency components of measured acceleration and magnetism and the high-frequency components of angular rate from the gyroscope. It works on the principal that over long durations, the average measured acceleration will be in the upwards direction due to gravity. Similarly, the average magnetism will be towards the Earth's magnetic north pole. Over short durations, the change in the instrument's orientation is determined from the gyroscope data.

At each sample/timestep, the change in orientation can accurately be measured using the gyroscope's angular rate data. The angular rate measured by the gyroscope is integrated to determine how much the instrument has rotated since the previous timestep. Then, that rotation is applied to the previous timestep's orientation estimate to produce a new estimate. However, since small errors in the gyroscope data will accumulate over time, another step is taken to ensure the orientation estimate does not diverge from the true orientation over time. Thus, at each timestep, a small addition correction is made to the orientation estimate, such that the "up" and "forward" vectors are nudged towards the measured acceleration and magnetism vectors, respectively. This is accomplished using a computationally efficient gradient-descent algorithm. The relative contributions of the angular rate, and acceleration/magnetism at each timestep is defined by a single tunable parameter.

Furthermore, offset errors in the gyroscope data can bias the orientation estimate. Thus, a dynamic bias correction is applied to the gyroscope data. This is accomplished by averaging the small rotational corrections based on acceleration and magnetism over a long period of time, and subtracting that average from the gyroscope data.

When the instrument first begins sampling, its orientation estimate is likely to be inaccurate. It starts with a "guess" assuming the upward direction is towards the top of the instrument. A parameterized "orientation filter settle duration," typically 150 seconds, allows time for the filter and dynamic bias correction to settle and for the orientation estimate to converge to the true orientation.

Controller 103

The present disclosure provides for a digital control component, referred herein as simply the controller 103. The controller hardware may be any suitable solution as known in the art. In the currently preferred embodiment, controller 103 is a Teensy 3.6 Development Board commercially available from PJRC. The controller 103 analyzes and transforms data or information obtained by other components of the device (e.g., IMU and absolute sensor), as disclosed in more detail elsewhere herein. The preferred data transformation is computationally efficient necessitating a simple controller and controller pieces; for example, the preferred embodiment uses about 100 bytes of nonvolatile memory.

Activator 104

The present disclosure provides for a solution such as activator 104 to reversibly activate and "sleep" (deactivate) controller 103. Activator 104 may be any suitable solution as known in the art to be utilized in the present invention. In the currently preferred embodiment, activator 104 is a silicone logic switch pre-programmed to activate and de-activate the controller 103. The activator 104 may be programmed to put controller 103 into a sleep state (i.e., a so-called "low-power state"), or to turn it off completely.

In one example, the controller is programmed to turn on the controller in cycles of 10 minutes on and 23 hours and 50 minutes off, before beginning the cycle again. The on and off periods (or active and sleep) depend on the embodiment and are preferably customizable. In some embodiments, the activator begins a cycle based on a cue, typically information provided to it by a sensor or communications mechanism 106 elsewhere in the device 100. The typical application for a WIMS according to the present invention is on an air-deployed profiling float. These instruments go up and down in the ocean by adjusting their buoyancy with an external bladder that can be inflated or deflated in order to collect temperature or salinity "profiles." The pressure transducer is utilized both so that the profiles are gridded against pressure and also for the float's control system so that it can ascend at a controlled rate. Once the instrument arrives at the surface, it actives WIMS which typically runs for 10 minutes, then records the resulting spectral data. Them the WIMS and other data is telemetered via satellite communication, before the profiling float descends and repeats the process.

Figure 4:
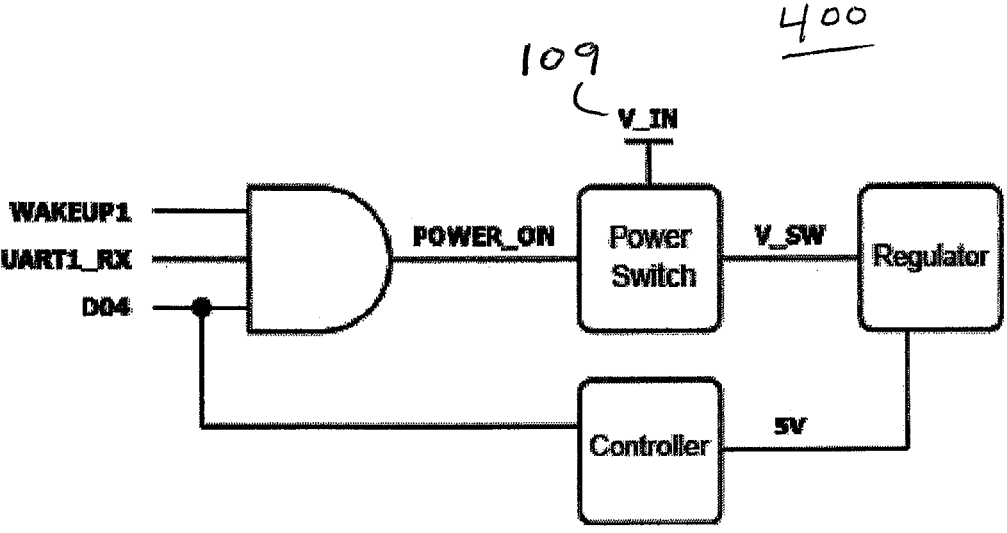
FIG. 4 is one schematic circuit diagram of a power switching circuitry according to one embodiment.

In one embodiment, activator 104 is a power switching circuit inboard of a 5V regulator, enabling very low quiescent current during shutdown. A simplified diagram of the power circuitry 400 is shown in FIG. 4. A rising edge on either WAKEUP1 or UART1_RX will enable the power switching circuit. Once the device is powered on, the controller will assert the D04 signal to ensure the power switching circuit will remain enabled during operation. The D04 signal will remain asserted until the controller receives the "sleep" command. The power switching circuit dictates sequencing when powering the device on or off. When the device is powered down, asserting WAKEUP1 or UART1_RX will raise the POWER_ON signal and enable the 5V regulator. Once the controller is powered on, it will assert and hold the D04 signal ensuring that the power switching circuit remains on. The D04 signal will remain asserted until the "sleep" command is received. When powering down the device, the "sleep" command will cause the controller to de-assert the D04 signal. Subsequently, both the WAKEUP1 and UART1_RX signals must be driven low (or floated) to disable the power switching circuit. Both signals must remain low until the next time the device is to be powered on.

Figure 5:
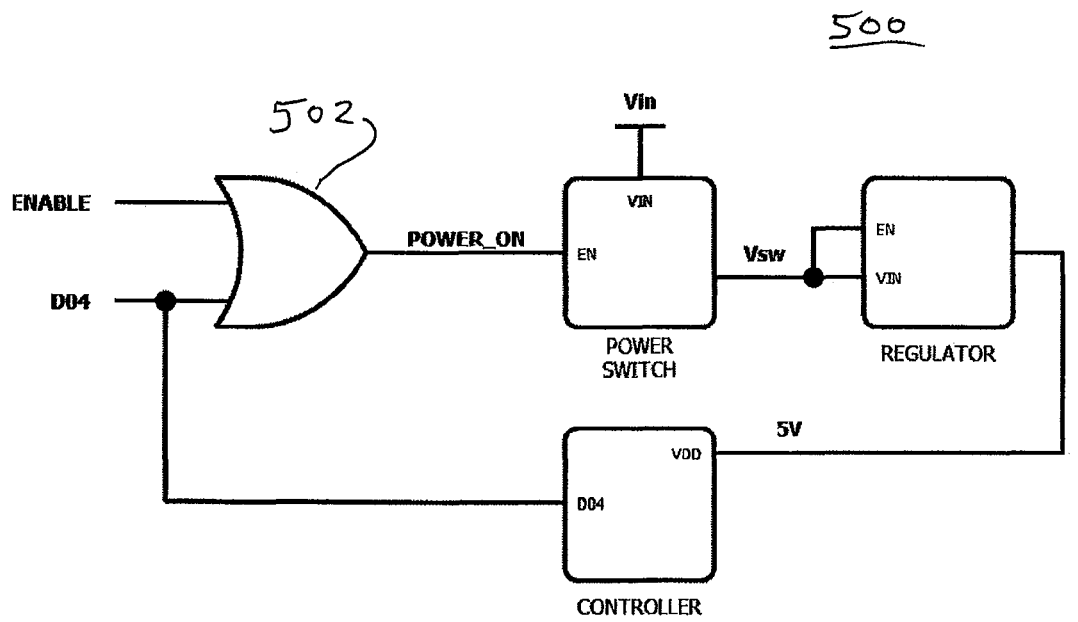
FIG. 5 is another schematic circuit diagram of an alternative power switching circuitry.
Figure 6:
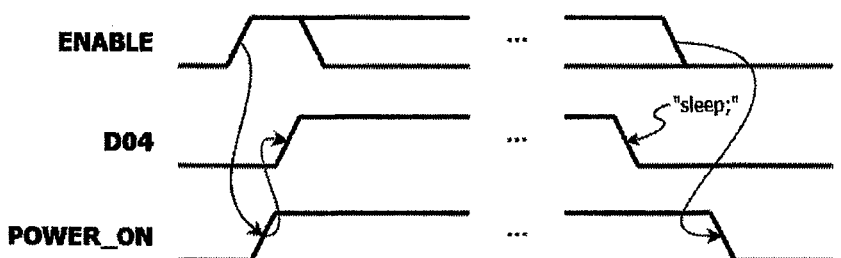
FIG. 6 is a schematic diagram of signal sequencing in the power switching circuitry of FIG. 5.

An alternative power switching circuit is illustrated in FIGS. 5 and 6. A simplified diagram of the alternative power circuitry 500 is shown in FIG. 5 having OR Gate 502. A rising edge on either ENABLE will enable the power switching circuit. Once the device is powered on, the controller will assert the D04 signal to ensure the power switching circuit will remain enabled during operation. The D04 signal will remain asserted until the controller receives the "sleep" command.

The power switching circuit dictates sequencing when powering the device on or off, as illustrated in FIG. 6. When the device is powered down, asserting ENABLE will raise the POWER_ON signal and enable the 5V regulator. Once the controller is powered on, it will assert and hold the D04 signal ensuring that the power switching circuit remains on. The D04 signal will remain asserted until the "sleep" command is received. When powering down the device, the "sleep" command will cause the controller to de-assert the D04 signal. Subsequently, the ENABLE signal must be driven low (or floated) to disable the power switching circuit. Both signals must remain low until the next time the device is to be powered on.

Data Transformation

Figure 2:
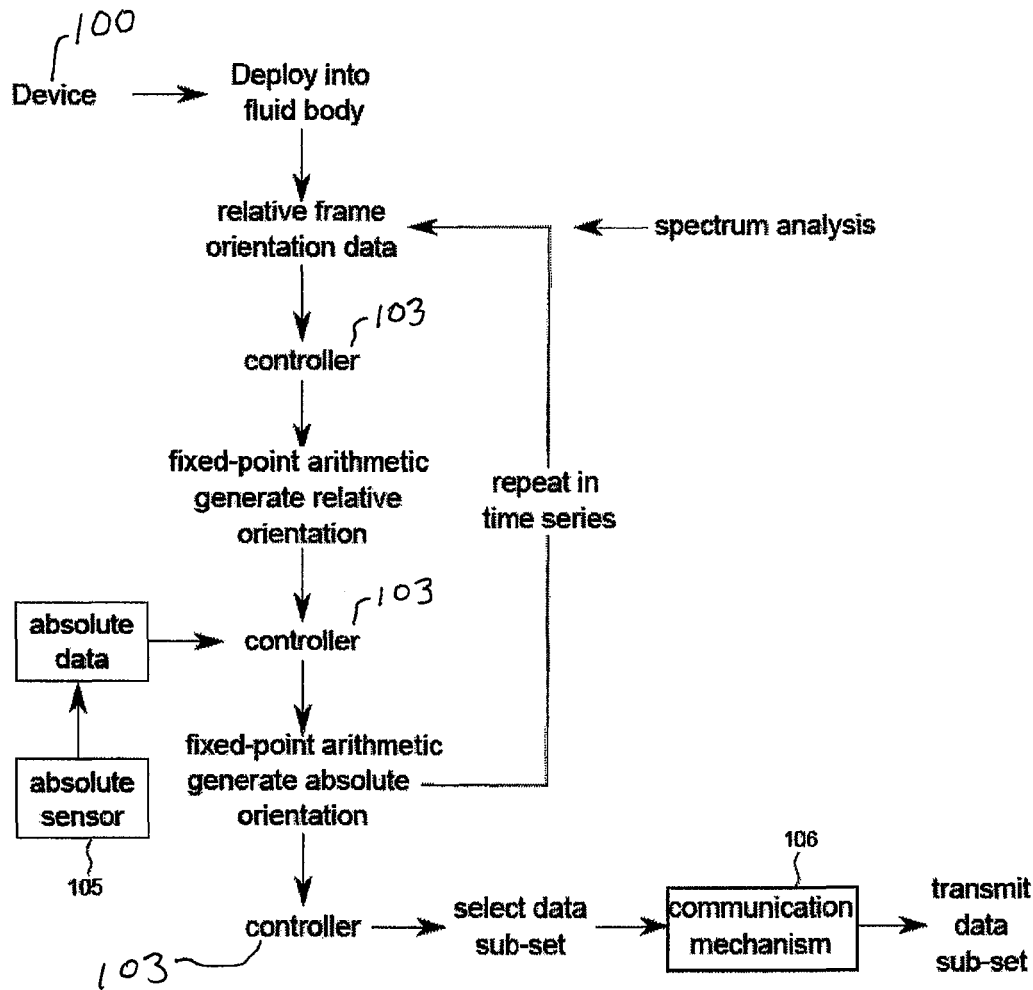
FIG. 2 is a schematic flow diagram of one method of use according to the present invention.

The present disclosure and controller 103 provide for mathematical solutions to process the device's data to generate wave measurements. The controller 103 calculates a wave height and direction wavefield, converts the wavefield into a frequency domain and converts from a relative reference frame to an absolute reference frame as indicated in FIG. 2, for example, as generating "relative orientation" and then "absolute orientation". Controller 103 also selects a subset of data to transmit via the communications mechanism 106. The controller typically only calculates the acceleration spectra in Earth-fixed coordinates, which typically is selected as the data that is telemetered from which it is derived the wave-field parameters of interest such as displacement spectra and wave period, height, and direction.

To generate wave measurements, the controller 103 determines the orientation of the IMU. In the currently preferred embodiment, the controller 103 utilizes an algorithm to calculate a local minimum of a differentiable function. The local minimum enables the controller 103 to determine high frequency orientation in the relative reference frame. In the currently preferred embodiment, controller 103 utilizes a gradient descent algorithm. The step size of the gradient descent algorithm is typically proportional to the gradient which is determined from the normalized acceleration and magnetic measurements. The controller 103 may pre-program the base sample rate of the IMU, and is programmable anywhere from 4 to 1125 Hz, and the step size is then based on sample rate. Typically, base sample rate is 45 Hz. The currently preferred embodiment provides a single programmable parameter to set the relative contribution of the gradient descent algorithm and the angular rate of the gyro for each step, enabling an efficient algorithm with only one parameter needing optimization.

Figure 3:
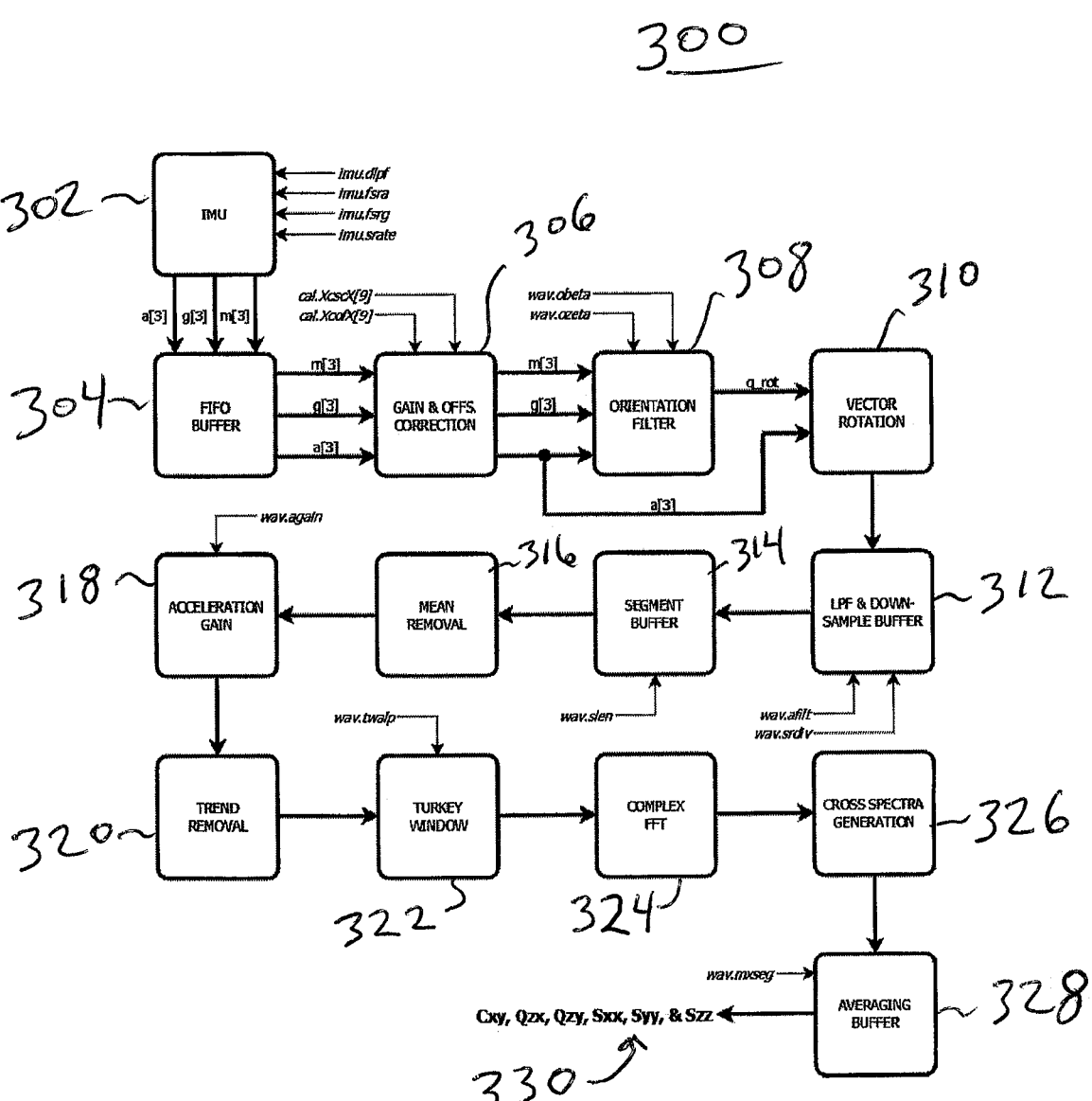
FIG. 3 is a component diagram of one embodiment's signal processing.

In some embodiments, controller 103 uses an orientation filter 308, FIG. 3, that uses the low frequency component of the magnetometer and accelerometer and the high frequency component of the gyroscope to calculate IMU orientation. The orientation filter converts IMU measurement data to imaginary a four-vector number and converts to a North- East-South-West-Up-Down (NESWUD) coordinate frame and rotates that into an Earth-, absolute coordinate frame. Once converted, the controller 103 performs spectral analysis on the three axes of orientation. In additional embodiments the orientation filter uses the gradient descent algorithm.

In general, the orientation filter is used to rotate hull-fixed acceleration measurements into the Earth reference frame. The filter is based on a computationally efficient gradient descent algorithm developed by Madgwick et al. and improved by Wilson et al. as cited and described above. The low frequency component of measured acceleration and magnetism are combined with the high frequency component of angular rate from the gyroscope to produce a running estimate of the floats' orientation, using a single tunable parameter to adjust the relative contributions of each. Additionally, the filter integrates the difference between the two components to automatically compute a gyroscope offset correction. In the WIMS firmware, the filter has been uniquely implemented using only fixed-point integer arithmetic to further reduce computational complexity.

Furthermore, controller 103 may utilize less computational power by performing only fixed-point arithmetic (i.e., no floating-point arithmetic). Fixed-point arithmetic reduces data precision, but requires less computational power to perform. Therefore, in the currently preferred embodiment, the controller 103 requires approximately only 3 Amps, 15 volts, and therefore represents only about 5 mW power drain on the system. Controller 103 performs a spectrum analysis over a series of IMU measurement data as a function of time. A transformation, typically a Fourier transform or a Fourier analysis, is done to convert the IMU measurement data to frequency or a magnitude of a wave period in a three-dimensional (3D) space and the controller further uses a 4D number to represent IMU rotation through this 3D space. The Fourier analysis is performed by controller 103 to select a subset of data from the IMU measurement data to be transmitted via communications mechanism 106. Typically, the subset of spectra are pre-programmed. They are determined by definition from: Longuet-Higgins, M. S., D. E. Cartwright, and N. D. Smith, 1963: Observations of the directional spectrum of sea waves using the motions of a floating buoy, in Ocean Wave Spectra. Prentice Hall, Englewood Cliffs, NJ, 111-136.

Using the Complex Fast Fourier Transform, there are 12 total possible spectra that can be produced. However, only six of these spectra are necessary to derive the wave-field parameters of interest. This selected subset is referred herein as selected data. After transmission, selected data may be used to reconstruct wave measurements (e.g., wave heights and direction).

Additionally, the controller 103 is programmable as to which type of data is saved, transformed or communicated. In the currently preferred embodiment, the controller may be programmed to select one or more of (i) Raw IMU counts as output data; (ii) intermediate orientation filter values and the quaternion representation of the orientation; (iii) acceleration referenced to the Earth-frame and the quaternion representation of the Earth-frame orientation; (iv) pitch, roll, and yaw angles with respect to the Earth-frame as well as the quaternion representation of the orientation; (v) power-spectral density computed from vertically-referenced acceleration, with acceleration referenced to the vertical frame and the quaternion representation of the vertical orientation is produced as an intermediate output; and (vi) select co- and quadrature power-spectral densities required for analysis of the directional wave field. Acceleration referenced to the Earth-frame and the quaternion representation of the Earth-frame orientation is produced as an intermediate output.

Which data is chosen in the selected subset depends on the embodiment and a user's pre-programming choices. For example, if only wave height data is desired, only a single vertical power spectrum of the orientation data is transformed and returned. For directional properties of the wave data, six spectra are selected and returned, including 3 power-spectra and 3 cross-spectra (consisting of two co-spectra and one quadrature spectrum).

The length of each spectra transformed and returned is programmable into controller 103 and is determined by half the segment length (e.g., the sampled data is segmented into chunks to be transformed and then the average of all the segments are returned). As one example, for a segment length of 256 samples, the spectra is 128 magnitudes at different frequencies. The values are represented as two-byte integers, resulting in a spectrum having typically 256 bytes. For one set of directional spectra, data size results in six spectra each of 256 bytes per spectra for a total of 1536 bytes. This is compared to conventional, unselected, raw 9-axis data sampled at 45 Hz for a run time of 10 minutes from 600 seconds times 45 Hz times 9 channels (from each axis) times 2 bytes per sample, resulting in 486,000 bytes. In addition to selecting a data subset, most embodiments enable the controller to programmatically to either or both down sample and filter data from interconnected components (e.g., IMU 102). Preferably the down sampling and filtering amounts are pre-programmable by a user, and specific for each IMU subcomponent channel (i.e., axis).

Housing 101

The present disclosure provides for a housing to contain the various components of the device 100, referred herein as housing 101. The housing 101 may be any suitable housing as known in the art. Housing 101 is preferably water and gas tight, protecting the components inside the housing 101 from environmental affects (e.g., water damage, shorts, and corrosion). Typically, the controller, activator and ballasting components are located within housing 101. In some embodiments, the housing 101 protects an overall larger sensor, for example an autonomous vertically profiling float like the ALAMO (Air Launched Autonomous Micro-Observer) float commercially available from MRV systems, or the ARGO class of floats commercially available from several suppliers.

Communications

The present disclosure provides for a communications mechanism 106 to send and receive information to and from device 100. The communications mechanism may be any suitable solution as known in the art, including, but not limited to satellite comms, a radio, cellular network, WIFI, and combinations thereof. Typically, the communications mechanism 106 is informationally connected to the controller 103 and enables controller 103 to send scientific data (e.g. wave measurements) back to a base station.

Additional components in some constructions include a power source 109, FIG. 4, and an absolute sensor 105, FIG. 2. The power source 109 may be any suitable solution as known in the art. In the currently preferred embodiment, power source 109 is a battery. Power source 109 is operatively connected to the device's electronic components such that it supplies power, for example, to the controller 103, the IMU 102, any sensors, the activator 104 and the communications mechanism 106.

The power source 109 is most often one or more battery or battery packs, preferably a rechargeable battery, such as two 12-volt rechargeable lead-acid batteries connected in series manufactured by PowerSonic. The energy capacity of the power source is more than adequate for powering provided components. The power source is sized such that the device 100 is deployed and used periodically over a period of hours, over a period of days, or over a period of weeks. Alternatively, the power source may be sized such that the device 100 is deployed and used constantly over a period of hours up to a period of days.

The absolute sensor 105 may be any suitable solution as known in the art. The absolute sensor 105 discerns its location in an Earth-frame coordinate system. In the currently preferred embodiment, the absolute sensor 105 is a GPS unit or other Global Navigation Satellite System (GNSS) unit.

Power requirements. In one exemplary embodiment, device 100 is incorporated into an ARGO-class float and the activator 104 is programmed to activate the controller 103 for ten minutes once a day, when the float is at the ocean's surface. The controller 103 and IMU 102 require approximately 100 mW of power; thus requiring 6 Joules per minute or 60 J for a single activation cycle (here representing a daily power requirement). This is compared to a typical ARGO float that expends approximately 5 kJ on a typical profiling dive. In another embodiment, the device 100 operate on a supply of 6.5 to 16.5 V. In other embodiments, device 100 is powered using a 5V supply, 5V USB, or with a 3.3 V supply. In the currently preferred embodiment, while device 100 is running (i.e. not in sleep mode), all the components draw about 5.5 mA at a nominal 15 V for about 80 mV of power. In low power mode (i.e. sleep mode), all of device's components about 100 nA quiescent current, roughly 1.5 μW, with a typical run time of about 10 minutes, while device is at the ocean's surface. The IMU 102 preferably runs on a 1.8 V supply, using as low as 2.5 mW of power.

A brief overview of the device's signal processing in spectral output mode according to one embodiment of a component diagram 300 is illustrated in FIG. 3. Samples from the accelerometer, gyroscope, and magnetometer of IMU 302 are buffered in FIFO Buffer 304 before gain and offset corrections are applied by component 306. A gradient-descent sensor fusion algorithm is used by the orientation filter 308 to estimate the devices orientation such as described above. That orientation estimate is used to rotate the acceleration vector from the sensor to the Earth-frame in vector rotation 310. After the acceleration vectors are rotated into the Earth-frame, they are low-pass filtered and down-sampled in UP & DOWN SAMPLE BUFFER 312. The acceleration time-series are then divided into 50% overlapping segments in SEGMENT BUFFER 314. The mean is removed from each segment in MEAN REMOVAL 316, a programmable gain is applied in ACCELERATION GAIN 318, and a linear regression is used to remove any trend in TREND REMOVAL 320. A cosine-taper turkey window is then applied in TURKEY WINDOW 322 to reduce spectral leakage before a complex Fast Fourier Transfer (CFFT) is performed in COMPLEX FFT 324. The complex amplitude spectra are then used to generate select Power- and Cross-Spectra in CROSSS SPECTRA GENERATION 326, which are then averaged across each segment in AVERAGING BUFFER 328 to produce the final result 330 such as values for Cxy, Qzx, Qzy, Sxx, Syy and Szz.

The segment acceleration cross- and power-spectra are computed from the real and imaginary components produced by the CFFT. "Cxy", "Qzx", and "Qzy" are the co-spectral and quadrature-spectral densities required for directional wave spectra. The individual values may be positive or negative and will fall in the range of a two-byte signed integer, [−32768, 32767]. "Sxx", "Syy", and "Szz" are the acceleration power-spectral densities for each axis. These values are always positive and fall in the range of an unsigned two-byte integer, [0, 65535]. Cxy, Qzx, and Qzy are the co-spectral and quadrature-spectral densities most often used for directional wave spectra. The individual values may be positive or negative and will fall in the range of a two-byte signed integer, [−32768, 32767]. Sxx, Syy, and Szz are the acceleration power-spectral densities for each axis. These values are always positive and fall in the range of an unsigned two-byte integer, [0, 65535].

In one construction, a chip J0 has USB Micro B Power & Programming. The USB connector is used for programming the device. It may also be used to power the device. When the USB is connected, VIN should be disconnected or toggled off using switch S1.

In one construction, additional connector pinouts are as shown in Tables 1-4 below:

TABLE 1

| | | J1-Power |
| --- | --- | --- |
| Pin | Name | Description |
| 1 | GND | Ground. |
| 2 | VIN | 6~16.5 V primary power input. This input has 220 mA resettable PTC fuse and can be toggled with switch S1. |
| 3 | GND | Ground. |
| 4 | 5V | 5 V input/output. If configured as an input, then VIN should be disconnected or toggled off using switch S1. Otherwise, this pin can source 400 mA. |

TABLE 2

| | | J2-Comms 1 |
| --- | --- | --- |
| Pin | Name | Description |
| 1 | GND | Ground. |
| 2 | UART1_TX | Primary UART transmit, 3.3 V TTL logic. |
| 3 | UART1_RX | Primary UART receive, 3.3 V TTL logic and wakeup. When the device is in sleep mode, driving this signal high will wake the device. When entering sleep mode, this signal must be driven low or left floating to disable the power switching circuit. This signal is pulled up while the device is awake. After receiving the sleep command, this signal will be pulled down. |
| 4 | WAKEUP | Wakeup signal. Pulsing this signal will wake the device. While this signal is high, the power switching circuit will be enabled. When entering sleep mode, this signal must be driven low or left floating to disable the power switching circuit. This signal is pulled down. |
| 5 | AUXIO | Programmable auxiliary GPIO. |
| 6 | 3V3OUT | 3.3 V output, 100 mA max. |

TABLE 3

| | | J3-Comms 2 |
| --- | --- | --- |
| Pin | Name | Description |
| 1 | GND | Ground. |
| 2 | UART1_TX | Primary UART transmit, 3.3 V TTL logic. |
| 3 | UART1_RX | Primary UART receive, 3.3 V TTL logic and wakeup. When the device is in sleep mode, driving this signal high will wake the device. When entering sleep mode, this signal must be driven low or left floating to disable the power switching circuit. This signal is pulled up while the device is awake. After receiving the sleep command, this signal will be pulled down. |
| 4 | WAKEUP | Wakeup signal. Pulsing this signal will wake the device. While this signal is high, the power switching circuit will be enabled. When entering sleep mode, this signal must be driven low or left floating to disable the power switching circuit. This signal is pulled down. |
| 5 | AUXIO | Programmable auxiliary GPIO. |
| 6 | 3V3OUT | 3.3 V output, 100 mA max. |

TABLE 4

J4-Auxiliary Comms

| Pin | Name | Description |
|---|---|---|
| 1 | GND | Ground. |
| 2 | UART5_TX | Auxiliary UART transmit, 3.3 V TTL logic. |
| 3 | UART5_RX | Auxiliary UART receive, 3.3 V TTL logic. |
| 4 | VIN | 5.5~16 V auxiliary power input. This input is not fused. |
| 5 | AUXIO | Programmable auxiliary GPIO. |
| 6 | 3V3OUT | 3.3 V output, 100 mA max. |

TABLE 5

User Commands

| IDX | Command | Args | Description |
|---|---|---|---|
| 0 | baud | 1 | Set serial port BAUD rate. |
| 1 | get | 1 | Get parameter value. |
| 2 | load | 0 | Load configuration parameters from data flash. |
| 3 | mcal | 0 | Magnetometer calibration. |
| 4 | read | 0-1 | Print one or more spectra. |
| 5 | run | 0 | Start run. |
| 6 | save | 0 | Save configuration to data flash. |
| 7 | set | 2 | Set parameter value. |
| 8 | sleep | 0 | Enter low power sleep mode. |
| 9 | test | 1 | Run debug test. |
| 10 | vers | 0 | Print firmware and hardware version information. |

In one construction, when the WIMS device is powered on, it will print the command prompt character, a greater-than symbol, after initialization to indicate that it is ready to accept user commands. Commands may be delimited with a newline character or semicolon. When a command delimiter is received, a semicolon will be returned. If a backspace or escape character is received, then no semicolon will be returned, and a command prompt character is printed on a new line. Command arguments are delimited by whitespace. The "baud" command, IDX 0 in Table 5 above, sets the serial port BAUD rate in bytes per second. The available BAUD rates are 9600, 19200, 32400, 57600, 115200, or 230400 BPS. At startup, the device will always be set to the default BAUD rate of 115200 BPS.

The "get" command, Table 5, will return the value of any of the configuration parameters. The format of the response is given by $$param\ <idx>\ <param> = <value>\ \#\ <[units]>\ <desc> \qquad \text{Equation 1}$$

where <idx> is the parameter index, <param> is the parameter name string, <value> is the current value of the parameter, <[units]> is the square-bracket enclosed parameter units, and <desc> is a brief description. The term <[units]> is omitted for parameters with no applicable units.

The "load" command, Table 5, loads configuration parameters from nonvolatile memory. If the parameter hash stored in nonvolatile memory does not match the one computed from the loaded parameters, then the default parameters will automatically be loaded saved to nonvolatile memory. Configuration parameters are automatically loaded from nonvolatile memory during initialization, so it is not necessary to invoke the load command after power on.

The "mcal" command, Table 5, initiates the magnetometer calibration routine, which will continue to execute indefinitely until further input is received from the user. Upon completion of calibration, scale and offset corrections for each of the three magnetometer axes will be computed and the associated parameters will be automatically updated. The user must subsequently invoke the save command to persist the calibration parameters to nonvolatile memory.

The "read" command, Table 5: After the completion of a run where the device computes one or more acceleration spectra, the spectra can be read from memory using the "read" command. The spectra can be printed individually using the arguments 1 through 6 for the following: Cxy, Qzx, Qzy, Sxx, Syy, & Szz—Averaged Acceleration Cross- and Power-Spectra. Alternatively, all spectra can be printed at once by omitting the argument or using the argument "0". Note that the length of the spectra is determined by the "imu.slen" parameter in this construction.

The "run" command, Table 5: Once received, the device will start sampling. The exact behavior of the device depends on the sample mode, defined by the wav.omode parameter. The device will run until either the maximum number of samples or segments is exceeded in this construction.

The "save" command, Table 5, saves the current configuration to nonvolatile memory. When saved, the device also computes and stores a hash so that subsequently loaded configurations can be validated.

The "set" command, Table 5, responds with text identical to the "get" command. Not that for some parameters, only certain values are valid. In response to receiving an invalid value, either the nearest valid value will be selected (as show in the listing below), or the parameter value will remain unchanged. See the individual configuration parameter descriptions which describe the valid values for each parameter.

The "sleep" command, Table 5, invokes WAKEUP1 and UART1_RX in the circuit 400 construction, FIG. 4, and invokes "ENABLE" in the circuit 500 construction, FIG. 5. Once received, the UART1_RX and WAKEUP signals must be left floating or driven low to disable the power switching circuit.

The "test" command, Table 5, can be utilized to run one of the debug tests. In one construction, this command is only available for the firmware DEBUG build configuration.

The "vers" command, Table 5, returns the firmware version identifier.

Although specific features of the present disclosure are shown in some drawings and not in others, this is for convenience only, as each feature may be combined with any or all of the other features in accordance with the disclosure. While there have been shown, described, and pointed out fundamental novel features of the disclosure as applied to a preferred embodiment thereof, it will be understood that various omissions, substitutions, and changes in the form and details of the devices illustrated, and in their operation, may be made by those skilled in the art without departing from the spirit and scope of the disclosure. For example, it is expressly intended that all combinations of those elements and/or steps that perform substantially the same function, in substantially the same way, to achieve the same results be within the scope of the disclosure. Substitutions of elements from one described embodiment to another are also fully intended and contemplated. It is also to be understood that the drawings are not necessarily drawn to scale, but that they are merely conceptual in nature.

It is to be understood that the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on, or executable by, a programmable computer including any combination of any number of the following: a processor, a storage medium readable and/or writable by the processor (including, for example, volatile and non-volatile memory and/or storage elements), an input device, and an output device. The input device and/or the output device form a user interface in some embodiments. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically determine IMU orientation data in a relative reference frame, automatically update data in an electronic memory representing such IMU orientation, automatically transforms the relative reference frame into an absolute reference frame using position data, and automatically and wirelessly transmits wave data to a server over a digital electronic network for storage and processing. Such features can only be performed by computers and other machines and cannot be performed manually or mentally by humans.

Any claims herein which affirmatively require a computer, a processor, a controller, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a controller, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays).

A computer can generally also receive (read) programs and data from, and write (store) programs and data to, a non-transitory computer-readable storage medium such as an internal disk (not shown) or a removable disk or flash memory. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium or other type of user interface. Any data disclosed herein may be implemented, for example, in one or more data structures tangibly stored on a non-transitory computer-readable medium. Embodiments of the invention may store such data in such data structure(s) and read such data from such data structure(s).

It is the intention, therefore, to be limited only as indicated by the scope of the claims appended hereto. Other embodiments will occur to those skilled in the art and are within the following claims.

What is claimed is:

1. A wave measuring device, comprising:
a controller;
an inertial measurement unit (IMU) connected to the controller configured to send IMU orientation data to the controller;
an absolute sensor connected to the controller and configured to send position data to the controller;
wherein the controller determines the orientation of the IMU in a relative reference frame of the IMU using the IMU orientation data and fixed-point arithmetic; and
wherein the controller is configured to transform the relative reference frame into an absolute reference frame using the position data and fixed-point arithmetic, producing wave data.

2. The wave measuring device of claim 1 further comprising an activator connected to the controller, the activator configured to place the controller in a low-power state.

3. The wave measuring device of claim 1, wherein the controller is configured to use a gradient descent algorithm to determine the orientation of the IMU in the relative reference frame.

4. The wave measuring device of claim 1 further comprising a housing configured to surround and protect the controller and the IMU.

5. The wave measuring device of claim 4 wherein the device is an oceangoing float.

6. The wave measuring device of claim 5 wherein the device is configured to reversibly float at a depth in the ocean and reversibly float on the ocean surface.

7. The wave measuring device of claim 6 further comprising an activator connected to the controller, the activator configured to place the controller in a low-power state when the device is below the ocean's surface.

8. The wave measuring device of claim 1 further comprising a communications mechanism connected to the controller.

9. The wave measuring device of claim 8 wherein the controller is configured to select a subset of the wave data through said communications mechanism.

10. A method for wave measurement, comprising the steps of:

(a) selecting a device comprising a controller, an inertial measurement unit (IMU) connected to the controller, and an absolute sensor connected to the controller, wherein the IMU is configured to produce IMU orientation data and the absolute sensor is configured to produce position data;

(b) sending the IMU orientation data from the IMU to the controller;

(c) sending the position data from the absolute sensor to the controller;

(d) calculating, with the controller, the orientation of the IMU in a relative reference frame using the IMU orientation data and fixed-point arithmetic, producing a relative orientation; and (e) transforming, with the controller, the relative orientation into an absolute orientation using the positioning data and fixed-pointed arithmetic, producing wave data.

11. The method of claim 10 further comprising the step of:

(f) collecting an orientation time series of orientation data with the IMU over a period of time.

12. The method of claim 11 further comprising the step of:

(g) performing a spectrum analysis with the controller on the orientation time series.

13. The method of claim 12, wherein the spectrum analysis uses a Fourier transformation.

14. The method of claim 10, wherein the device further comprises a communications mechanism connected to the controller.

15. The method of claim 14 further comprising the steps of:

(h) selecting a subset of the wave data to produce a data subset; and (i) wirelessly transmitting, with the communications mechanism, the data subset.

16. The method of claim 10 wherein the device is selected to include an activator connected to the controller and configured to place the controller in a low-power state.

17. The method of claim 10 wherein the step (d) utilizes a gradient descent algorithm.

18. The method of claim 17 wherein the device is selected to be an ocean-going float configured to reversibly float at a depth in the ocean; and further comprising the steps of (j) moving the device below the surface of the ocean; and (k) placing, with the activator, the controller in a low-power state when the device is moved below the surface of the ocean.

\* \* \* \* \*